UNITED STATES PATENT OFFICE.

JOHN W. CAIN, OF MAXTON, NORTH CAROLINA.

PLOW.

955,759.　　　Specification of Letters Patent.　　Patented Apr. 19, 1910.

Application filed April 9, 1909. Serial No. 488,865.

*To all whom it may concern:*

Be it known that I, JOHN W. CAIN, a citizen of the United States, residing at Maxton, in the county of Robeson, State of North Carolina, have invented certain new and useful Improvements in Plows; and I do hereby declare the following to be a full, clear, and exact description of the invention, such as will enable others skilled in the art to which it appertains to make and use the same.

This invention relates to improvements in attachments for plows, and has for its object the provision of a means whereby the pitch of the mold board may be regulated as desired.

Another object is the provision of an improved means for adjusting the mold board whereby the depth of the furrow may be regulated.

A further object is the provision of an improved form of brace by means of which lateral strain is taken from the adjusting device.

With these and other objects in view as will more fully hereinafter appear, the present invention consists in certain novel details of construction and arrangement of parts, hereinafter fully described, illustrated in the accompanying drawings and more particularly pointed out in the appended claim. It being understood that various changes in the form, proportion, size and minor details of the device may be made without departing from the spirit or sacrificing any of the advantages of the invention.

Figure 1:
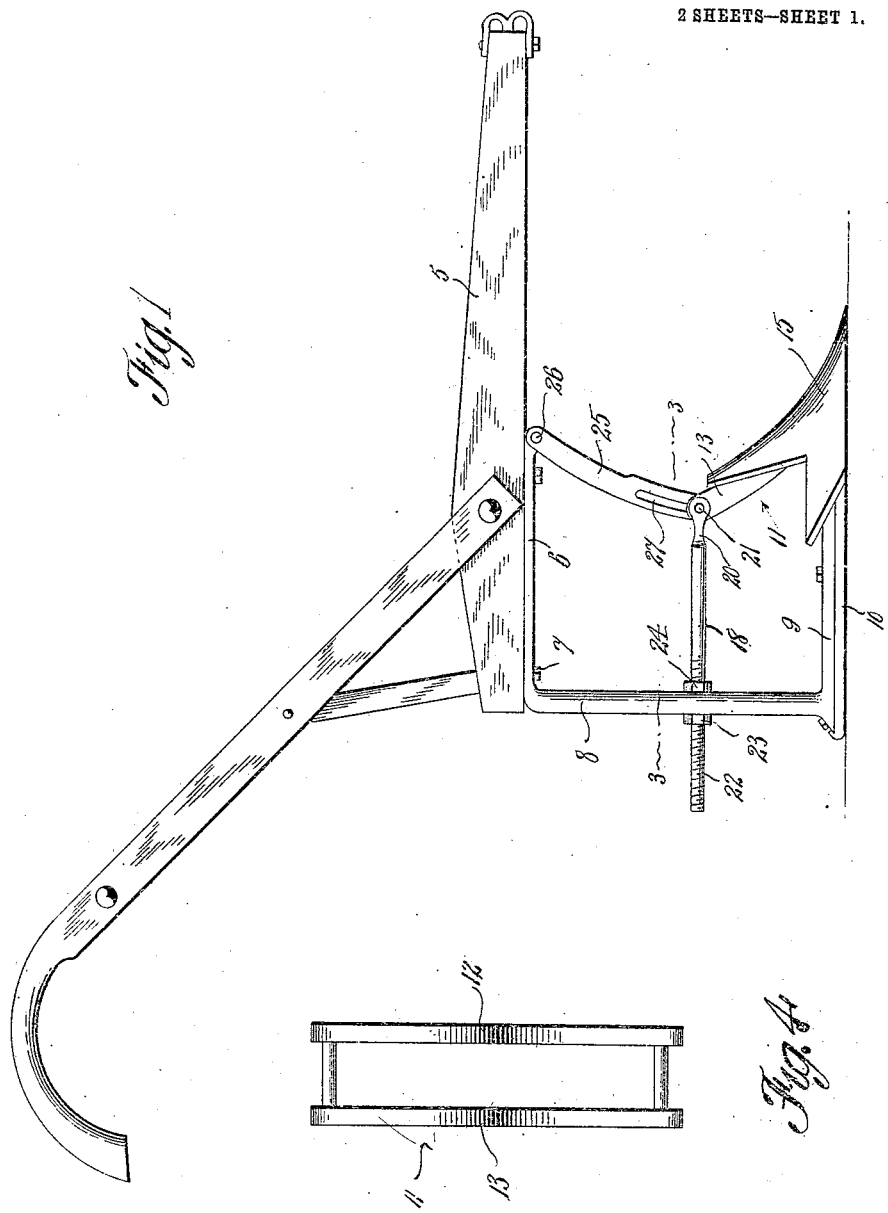
Figure 2:
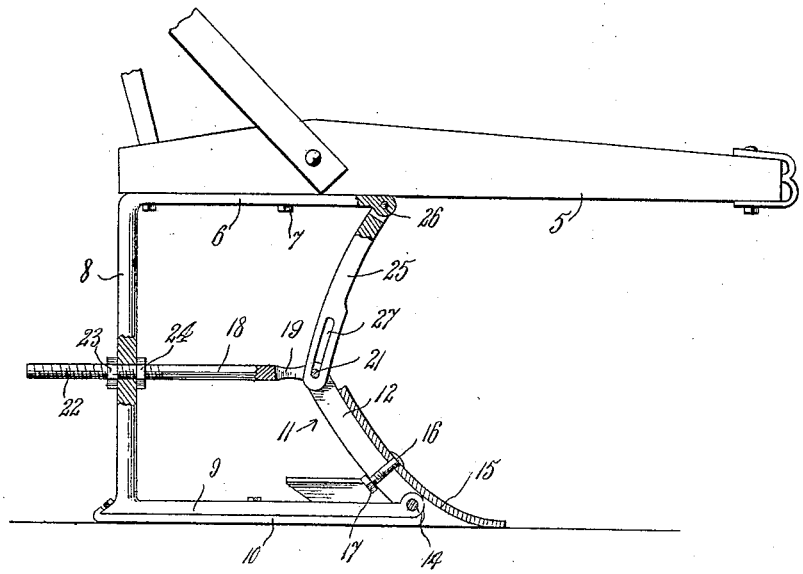
Figure 3:
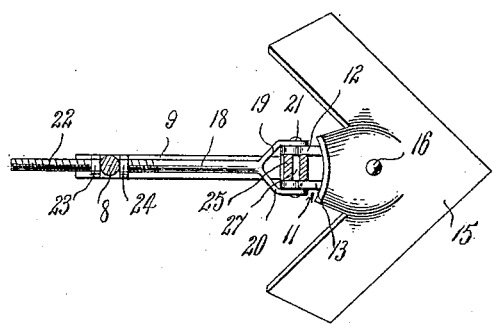
Figure 5:
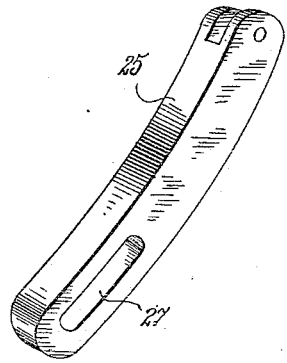

In the accompanying drawings forming part of the specification:—Figure 1 is a side elevation of a plow beam fitted with my improved device. Fig. 2 is a similar view but showing the plow share in section and a portion of its support broken away. Fig. 3 is a sectional plan view approximately on the line 3—3, Fig. 1. Fig. 4 is a detailed end view of the plow standard. Fig. 5 is a perspective view of the brace.

Similar numerals of reference are employed to designate corresponding parts throughout.

In the drawings the plow beam is designated by the numeral 5 and may be of any well known type.

A brace in the present instance is shown to be constructed of a single piece of bar iron, one end portion of which is bent as shown at 6 so as to be parallel with the beam 5 and is secured to the latter by means of bolts 7 or the like. The portion 6 terminates in a downwardly bent portion 8 at right-angles to the beam and this in turn terminates in a forwardly bent portion 9 of substantially the same length as the portion 6 and extending parallel with the latter. The portion 9 constitutes the runner of the plow and may have suitably clamped thereto an outer shoe 10.

The standard is designated by the numeral 11 and in the present instance is shown to be constructed of two straps 12 and 13 which straddle the forward end of the runner portion 9 and are pivoted thereto by means of a pivot bolt 14. The straps are arcuate in contour and their length equal to one half the length of the intermediate portion 8, or substantially so. Owing to the pivotal connection between the standard and runner it can be readily seen that the standard may be adjusted to any position in a vertical plane with respect to the runner 9.

The mold board is designated by the numeral 15, and is centrally provided with an opening which receives a bolt 16, the threaded shank of which extends between the straps of the standard and is secured to the rear sides thereof by means of an ordinary nut 17.

By referring now to the drawings it will be seen that the upper ends of the standards are pivotally connected to one end of an adjusting rod 18. This member is bifurcated at one end to provide a pair of jaws 19 and 20, which bear on the opposite outer faces of the standard straps and are held in place by means of a pivot bolt 21. The major portion of the adjusting rod is screw threaded as shown at 22, and extends through an opening formed in the intermediate portion of the section 8 of the frame, a pair of jam nuts are disposed on the threaded portion 22, on opposite sides of the section 8, so that the standard may be locked in any of its adjusted positions on either side of the vertical. Thus it can be seen that by manipulating the nuts 23 and 24 the mold board may be adjusted angularly with respect to the plow beam 5 and the depth of the furrow regulated.

With the construction thus far described it can be seen that although the mold board may be adjusted and locked against movement nevertheless there will be more or less lateral strain on the adjusting rod when turning the plow at the end of the furrow or at other points when moving over the ground when extremely hard places are met with. In order to overcome this and to reduce the amount of lateral strain on the adjusting rod the following device is employed: By referring now to the drawings it will be seen that a suitable brace is employed which is designated by the numeral 25. This member is preferably formed of a single piece of bar iron having one end bifurcated and adapted to receive the extremity of the portion 6 of the frame, to which it is secured by means of a pivot bolt 26. The contour of the brace 25 is substantially the same as the standard 11 and adjacent its lower end is provided with a medially disposed longitudinal recess 27 which receives the pivot bolt 21. The width of the brace 25 is such that it will snugly fit between the straps 12 and 13 of the standard and when in this position and in engagement with the pivot bolt 21 it can be readily seen that excess lateral movement or strain on the adjusting rod 18 will be positively prevented. By virtue of the slot 27 the adjustment of the standard will not be prevented and downward movement of the latter will be prevented beyond a certain point.

Thus it can be seen that I have provided a device which is exceedingly simple in structure and comparatively inexpensive to manufacture and which may be applied to most forms of plows now in use.

Owing to the construction of the standard and brace herein shown it can be readily seen that the device may be employed equally as well with others as with the specific form of beam illustrated.

Having thus described my invention, what is claimed as new, is:—

The combination with a plow beam, of a supporting frame having an end portion parallel with and secured to the lower face of the beam an intermediate portion bent downwardly and at right angles to the beam and a shoe portion parallel with the first-named end portion, a standard having its lower end straddling and pivoted to the forward end of the shoe portion, a brace bar having its upper end pivoted to the extremity of the first-named end portion and its lower end portion provided with a slot and fitted into the upper end of the standard, an adjusting rod having one end bifurcated and straddling the upper end of the standard and a pivot bolt extending through the said slot and standard and the bifurcated ends of said adjusting rod, the body portion of the latter being provided with a screw thread and extending through the intermediate portion of the frame and means operating on the said threaded portion and disposed on opposite sides of the intermediate portion and serving to lock the adjusting member in any of its adjusted positions.

In testimony whereof, I affix my signature, in presence of two witnesses.

JOHN W. CAIN.

Witnesses:
H. W. POPE,
G. H. LEACH.